United States Patent
Gibson et al.

(10) Patent No.: US 8,320,944 B1
(45) Date of Patent: Nov. 27, 2012

(54) METHOD AND SYSTEM FOR CREATING/UPDATING CUSTOMER LISTS AND PROFILES

(75) Inventors: Kristina Gibson, San Francisco, CA (US); Ben Ross, San Francisco, CA (US); Christopher W. Phillips, Berkeley, CA (US); Tonya Rado, Tiburon, CA (US); Manish R. Shah, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 339 days.

(21) Appl. No.: 12/651,965

(22) Filed: Jan. 4, 2010

(51) Int. Cl.
*H04W 4/00* (2009.01)
(52) U.S. Cl. ............... 455/466; 455/414.1; 705/14.54
(58) Field of Classification Search .................. None
See application file for complete search history.

(56) References Cited

U.S. PATENT DOCUMENTS

| | | | |
|---|---|---|---|
| 2008/0262929 A1* | 10/2008 | Behr | 705/14 |
| 2009/0248742 A1 | 10/2009 | Krishnamurthy et al. | |
| 2010/0057567 A1* | 3/2010 | Desu Ramanjaneyulu | 705/14.54 |
| 2010/0332339 A1 | 12/2010 | Patel et al. | |
| 2011/0161152 A1* | 6/2011 | Kash et al. | 705/14.25 |
| 2011/0258137 A1 | 10/2011 | Pasta | |

OTHER PUBLICATIONS

Gibson et al., "Method and System for Creating a Web Listing Using a Mobile Phone," U.S. Appl. No. 12/697,462, filed Feb. 1, 2010.

* cited by examiner

*Primary Examiner* — Erika A Washington
(74) *Attorney, Agent, or Firm* — McKay and Hodgsons, LLP; Philip McKay; Sean P. Lewis

(57) ABSTRACT

A method and system for creating customer lists and customer profiles using mobile computing systems whereby A mobile computing system based marketing device, such as a Short Message Service (SMS) message, is created by the merchant and/or product marketer through a mobile application that includes one or more "hooks" that are presented to the mobile customers to inquire about a given mobile customer's interest level in the mobile computing system based marketing device and/or the specific offer made through the mobile computing system based marketing device. The mobile computing system based marketing device is then distributed to selected mobile customers and one or more of the selected mobile customers who receive the mobile computing system based marketing device respond, or fail to respond, to the mobile computing system based marketing device. Response data is then generated and stored in a mobile customer database and is used to create and/or update mobile customer profiles associated with the respective selected mobile customers in the mobile customer database.

24 Claims, 3 Drawing Sheets

METHOD AND SYSTEM FOR CREATING/UPDATING CUSTOMER LISTS AND PROFILES

BACKGROUND

Many merchants and/or product marketers, such as providers of consumer goods and services, and other advertisers, are very interested in creating/obtaining lists of potential and/or existing customers, and their associated contact information, and then determining, as precisely as possible, what customers are most receptive to a given product or service and/or offer associated with a given product or service. That is to say, many merchants and/or product marketers would like to establish/create as large a customer list as possible and to create customer profiles for each of their existing and potential customers on the customer list.

To this end, many merchants and/or product marketers currently devote significant energy to creating customer lists, typically by manual means such as writing down contact data, or manually keying customer contact data into one or more computing systems. However, using these methods, when the merchants and/or product marketers wish to contact a given customer, group of customers, or all their customers, to advise them of a special offer and/or provide them with a marketing device, the manually entered customer contact data must be retrieved, copied, and/or transferred to the offer and/or marketing device transmission means. In many cases this can be a daunting task.

In addition, many product marketers have developed, and currently employ, various methods for obtaining information regarding customers of their products and/or services to create customer profiles and/or to determine the effectiveness of their marketing efforts. These methods currently include gathering survey information, such as part of a product/warranty registration materials/process, and then processing this survey information in an effort to establish a profile for a given customer and/or determine the effectiveness of a given marketing campaign for the given customer.

While these current methods for obtaining customer lists and then creating customer profiles for existing and/or potential customers do produce some valuable results, they are limited in that they typically require considerable effort by both the merchant and the customer. In addition, current methods for obtaining customer lists often result in marketing efforts being directed to "customers" who are, in reality, not actually interested in the products and/or services and often view any contact as unwanted and a nuisance.

In addition, current methods for creating customer lists and then creating customer profiles for existing and potential customers typically do not make full use of the fact that many modern customers, and merchants, are "mobile customers/merchants" that regularly use mobile computing systems such as, but not limited to: portable computers; two-way pagers; cellular telephones; smart phones; digital wireless telephones; Personal Digital Assistants (PDAs); media players, i.e., an MP3 Player and/or other music and/or video player; Internet appliances; or any one or more other mobile systems and/or devices.

As a result of the situation discussed above, currently, merchants often spend unacceptable amounts of time attempting to create/obtain lists of potential customers and, in many cases, even when the time and energy is used to create the customer lists, many of these lists include potential customers who actually have no interest in the products and/or services offered by the product marketers and/or merchants. In addition, as a result of the situation discussed above, currently, obtaining accurate customer profile data is far too burdensome for the customer and therefore minimal customer participation is achieved, and/or responses are obtained from only certain segments of customers, typically only those with time, energy, and/or a hidden agenda/motivation.

SUMMARY

In accordance with one embodiment, a method and system for creating customer lists and customer profiles using mobile computing systems includes a process for creating customer lists and customer profiles using mobile computing systems whereby, in one embodiment, a mobile customer database is provided that includes a listing of one or more potential mobile customers and mobile computing system contact information for the potential mobile customers. In one embodiment, at least part of the mobile customer database data is provided by the one or more potential mobile customers sending their contact information, such as a mobile phone number, and a keyword, via a Short Message Service (SMS) message to a customizable virtual mobile number, i.e., a long code or short code, that a merchant and/or product marketer has posted. In one embodiment, a mobile computing system based marketing device, such as a Short Message Service (SMS) message, is created by the merchant and/or product marketer through a mobile application. In one embodiment, the mobile computing system based marketing device is associated with one or more products and/or services and is designed to be distributed via mobile computing systems. In one embodiment, the mobile computing system based marketing device includes one or more "hooks" that are presented to the mobile customers to inquire about a given mobile customer's interest level in the products and/or services associated with the mobile computing system based marketing device and/or the specific offer made through the mobile computing system based marketing device. In one embodiment, the mobile computing system based marketing device is distributed to selected mobile customers in the mobile customer database via their mobile computing systems and/or any other customer computing systems. In one embodiment, one or more of the selected mobile customers who receive the mobile computing system based marketing device respond, or fail to respond, to the mobile computing system based marketing device by: providing a response to the one or more hooks provided in the mobile computing system based marketing device including, in one embodiment, responding to a hook requesting the mobile customer to send an SMS text message response to a customizable virtual mobile number associated with the merchant in order to receive a marketing device, such as a coupon or discount voucher; not providing a response to the one or more hooks provided in the mobile computing system based marketing device; accepting/redeeming the offer set forth in the mobile computing system based marketing device; and/or not accepting/redeeming the offer set forth in the mobile computing system based marketing device. In one embodiment, response data is then generated that represents respective responses, or lack of responses, of the selected mobile customers. In one embodiment, the response data is correlated to the respective selected mobile customers and/or the one or more products and/or services associated with mobile computing system based marketing device, and/or the offer specifics set forth in the mobile computing system based marketing device. In one embodiment, the response data is then stored in the mobile customer database and is used to create and/or update mobile customer profiles associated with the respective selected mobile customers in the mobile customer database. In one embodiment, the created/updated mobile customer profiles associated with the respective selected mobile customers in the mobile customer database are then used to determine which of the selected mobile customers will be sent subsequent mobile computing system based marketing devices and/or the terms of any mobile computing system based marketing devices to be sent to the selected mobile customers. In one embodiment, the created/updated mobile customer profiles associated with the respective selected mobile customers in the mobile customer database are also used to determine the effectiveness of the mobile computing system based marketing devices.

Herein, the terms "merchant" and "product marketer" are used interchangeably and include, but are not limited to, providers of goods and services, and other advertisers, and/or any party and/or entity that interfaces with, and/or to whom information is provided by, a process for creating customer lists and customer profiles, and/or a person and/or entity that interfaces with, and/or to whom information is provided by, a process for creating customer lists and customer profiles, and/or a legal guardian of person and/or entity that interfaces with, and/or to whom information is provided by, a process for creating customer lists and customer profiles, and/or an authorized agent of any party and/or person and/or entity that interfaces with, and/or to whom information is provided by, a process for creating customer lists and customer profiles.

In one embodiment, the mobile customer database is a data storage device, a designated server system or computing system, or a designated portion of one or more server systems or computing systems, or a distributed database, or an external and/or portable hard drive. In one embodiment, the mobile customer database is a dedicated mass storage device implemented in software, hardware, or a combination of hardware and software. In one embodiment, the mobile customer database is a web-based function. In various embodiments, the mobile customer database is any data storage mechanism, means, process and/or procedure, as discussed herein, and/or as known in the art at the time of filing, and/or as developed after the time of filing.

In one embodiment, at least part of the initial listing of one or more potential mobile customers and mobile computing system contact information for the potential mobile customers is obtained by a given merchant signing up and/or creating an account with a mobile application/system and creating a customizable virtual mobile number, i.e., a long code or short code.

Herein, the term "long code" includes a reception mechanism often used by businesses to receive SMS messages and voice calls. Long codes are typically internationally available and enable businesses to have their own number, rather than short codes which are generally shared across a lot of brands.

In one embodiment, the given merchant then posts, or otherwise provides to customers and/or potential customers, their customizable virtual mobile number and informs the customers and/or potential customers that if they text their mobile contact information, such as a mobile telephone number, and a defined keyword or character string, to the posted customizable virtual mobile number, their mobile contact information will be added to the listing of one or more potential mobile customers in the mobile customer database and/or the customers and/or potential customers will become eligible for special offers in the form of one or more mobile computing system based marketing devices.

Using this particular method of obtaining at least part of the initial listing of one or more potential mobile customers and mobile computing system contact information for the potential mobile customers is advantageous in that the given merchant can create and/or increase their customer list with minimal effort on the part of both the given merchant and the potential customer by allowing potential mobile customers to populate their own information through their texting of the information to the customizable virtual mobile number that the given merchant has posted, for instance, in their storefront. In addition, the potential customers so acquired have already shown at least some interest in the product and/or service being offered by the given merchant by virtue of the fact they have taken the proactive action to add themselves to the potential customer list through their texting of the information to the customizable virtual mobile number.

In various other embodiments, at least part of the initial listing of one or more potential mobile customers and mobile computing system contact information for the potential mobile customers is obtained using any method, means, process and/or procedure for obtaining a list of one or more potential mobile customers and mobile computing system contact information for the potential mobile customers, as discussed herein, and/or as known in the art at the time of filing, and/or as developed after the time of filing.

Herein, the term "marketing device" is used to denote any advertisements, coupons, discount certificates, discount vouchers, sales offers, and/or any other marketing tool and/or device and/or offer that is presented, and/or offered to, and/or obtained by, any customer/consumer in any format.

In one embodiment, a mobile application is accessed by the merchant using any computing system discussed herein, and/or as known in the art at the time of filing, and/or as developed after the time of filing. In one embodiment, the merchant creates a mobile computing system based marketing device, such as an Short Message Service (SMS) message, that is associated with one or more products and/or services through the mobile application. In one embodiment, the mobile computing system based marketing device is designed to be distributed via mobile computing systems and/or networks.

In one embodiment, the mobile computing system based marketing device is created through a specialized mobile application that is a marketing tool for small business owners and is offered by a third party. In one embodiment, the mobile computing system based marketing device includes customizable content. In one embodiment, the customizable content takes the form of one or more "hooks". In one embodiment, the one or more hooks are presented to the mobile customers as part of the mobile computing system based marketing device and appear within the computing system based marketing device, for instance at the beginning, or end, of the computing system based marketing device.

As a specific illustrative example, in one embodiment, the one or more hooks are presented to the mobile customers on the bottom of an SMS mobile computing system based marketing device and request the mobile customer to send an SMS text message response to a customizable virtual mobile number associated with the merchant in order to receive a marketing device, such as a coupon or discount voucher or any other marketing device as discussed herein, and/or as known in the art at the time of filing, and/or as developed after the time of filing.

As another specific illustrative example, in one embodiment, the one or more hooks are presented to the mobile customers on the bottom of an SMS mobile computing system based marketing device to inquire about the mobile customer's interest level in the product and/or service and/or specific offer. In one specific example, the mobile customer is encouraged to SMS back to the customizable virtual mobile number the mobile customer's interest level in the offer set forth in the particular mobile computing system based marketing device via a rating. As an example, the customer can send "1" to show they want to redeem the offer set forth in the particular mobile computing system based marketing device, or "2" to say they do not want to redeem the offer set forth in the particular mobile computing system based marketing device.

In various embodiments, the mobile computing system based marketing device and/or one or more hooks are further customizable to accommodate the specific needs of the given merchant and/or a given potential mobile customer.

In one embodiment, the mobile computing system based marketing device is distributed to selected mobile customers via their mobile computing systems and/or one or more mobile computing system networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, the mobile computing system based marketing device is distributed to selected mobile customers that includes all mobile customers in the mobile customer database. In one embodiment, the mobile computing system based marketing device is distributed to selected mobile customers that are a sub-set of all the mobile customers in the mobile customer database. In one embodiment, the mobile computing system based marketing device is distributed to selected mobile customers that is a super-set of mobile customers including all the mobile customers in the mobile customer database.

In one embodiment, the responses, or lack of responses, from one or more of the selected mobile customers who receive the mobile computing system based marketing device are tracked and/or monitored by one or more processors associated with one or more computing systems associated with the mobile application and/or a provider of the mobile application.

In one embodiment, one or more of the selected mobile customers who receive the mobile computing system based marketing device may be deemed to respond to the mobile computing system based marketing device by providing a response to the one or more hooks provided in the mobile computing system based marketing device.

In one embodiment, one or more of the selected mobile customers who receive the mobile computing system based marketing device may be deemed to respond to the mobile computing system based marketing device by not providing a response to the one or more hooks provided in the mobile computing system based marketing device.

In one embodiment, one or more of the selected mobile customers who receive the mobile computing system based marketing device may be deemed to respond to the mobile computing system based marketing device by accepting/redeeming the offer set forth in the mobile computing system based marketing device.

In one embodiment, one or more of the selected mobile customers who receive the mobile computing system based marketing device may be deemed to respond to the mobile computing system based marketing device by not accepting/redeeming the offer set forth in the mobile computing system based marketing device.

In one embodiment, response data is generated by one or more processors associated with one or more computing systems associated with the mobile application and/or a provider of the mobile application that represents respective responses, or lack of responses, of the selected mobile customers.

In one embodiment, the response data generated includes, but is not limited to: whether or not a given mobile customer was interested in the product and/or service that was the subject of the mobile computing system based marketing device; whether or not a given mobile customer was interested in the terms of the offer that was provided via the mobile computing system based marketing device; any mobile customers that do not wish to be sent future mobile computing system based marketing devices associated with product and/or service that was the subject of the mobile computing system based marketing device; any mobile customers that do wish to be sent future mobile computing system based marketing devices associated with product and/or service that was the subject of the mobile computing system based marketing device; if the mobile computing system based marketing devices are reaching the mobile customers; any mobile customers that indicate an interest in the offer that was provided via the mobile computing system based marketing device but then failed to use/redeem the offer; any mobile customers that failed indicate an interest in the offer that was provided via the mobile computing system based marketing device but did use/redeem the offer; how many, or a percentage of, mobile customers responded at all to the mobile computing system based marketing device; and/or any other response data that is desired by the given merchant and that can be obtained using a mobile computing system based marketing device and one or more hooks.

In one embodiment, the response data is correlated to the respective selected mobile customers associated with the response data by, and/or under the direction of, one or more processors associated with one or more computing systems associated with the mobile application and/or a provider of the mobile application.

In one embodiment, the response data is correlated to the respective one or more products and/or services associated with mobile computing system based marketing device by, and/or under the direction of, one or more processors associated with one or more computing systems associated with the mobile application and/or a provider of the mobile application.

In one embodiment, the response data is correlated to the respective offer specifics set forth in the mobile computing system based marketing device by, and/or under the direction of, one or more processors associated with one or more computing systems associated with the mobile application and/or a provider of the mobile application.

In one embodiment, the correlated response data for each selected mobile customer is stored in a mobile customer profile account for the selected mobile customer created in the mobile customer database.

In one embodiment, the correlated response data for each selected mobile customer is used to update an existing profile account previously created for the selected mobile customer in the mobile customer database.

In one embodiment, the correlated response data, and/or customer profile data, for each selected mobile customer is then analyzed by, and/or under the direction of, one or more processors associated with one or more computing systems associated with: the merchant; the mobile application; and/or a provider of the mobile application.

In one embodiment, the correlated response data, and/or customer profile data, for each selected mobile customer is analyzed to determine which of the selected mobile customers will be sent subsequent mobile computing system based marketing devices.

In one embodiment, the correlated response data, and/or customer profile data, for each selected mobile customer is analyzed to determine the terms of any mobile computing system based marketing devices to be sent to the selected mobile customers.

In one embodiment, the correlated response data, and/or customer profile data, for each selected mobile customer is analyzed to determine the effectiveness of the mobile computing system based marketing devices.

In one embodiment, the correlated response data, and/or customer profile data, for each selected mobile customer is analyzed to determine the desirability of the one or more products and/or services that are the subject of the mobile computing system based marketing devices.

In one embodiment, the correlated response data, and/or customer profile data, for each selected mobile customer is analyzed to identify any other mobile customer, product and/or service data, and/or marketing data desired by the merchant and/or product marketer that can be determined by the correlated response data, and/or customer profile data, for each selected mobile customer using any methods, means, mechanisms, procedures and/or processes discussed herein, and/or known in the art at the time of filing, and/or as developed after the time of filing.

Using one embodiment of the method and system for creating customer lists and customer profiles using mobile computing systems, discussed herein, small business owners, or other merchants and/or product marketers, can add potential mobile customers to their customer lists by providing a mechanism for the customers themselves to populate their own contact information via texting to a customizable virtual mobile number that the business has posted. In addition, using one embodiment of the method and system for creating customer lists and customer profiles using mobile computing systems, discussed herein, the potential mobile customers indicate that they wish to be contacted by texting their contact information and thereby implicitly, or explicitly, consent to being contacted for marketing.

In addition, using one embodiment of the method and system for creating customer lists and customer profiles using mobile computing systems, discussed herein, small business owners, or other merchants and/or product marketers, can relatively easily create mobile customer profiles using the mobile customers' responses to mobile computing system based marketing devices distributed to mobile customer mobile computing systems and/or hooks in the mobile computing system based marketing devices. Then, using one embodiment of the method and system for creating customer lists and customer profiles using mobile computing systems, the small business owners, or other merchants and/or product marketers can use the mobile customer profiles to refine the mobile computing system based marketing devices and/or determine: the overall effectiveness of the mobile computing system based marketing devices; which mobile customers are interested in their specific mobile computing system based marketing devices; which mobile customers are loyal mobile customers; which mobile customers are receptive to specific mobile computing system based marketing devices; and/or which mobile customers are not receptive to specific mobile computing system based marketing devices; all from a centralized mobile application and database and without the need for manual methods such as notebooks and/or disjoint data files or manual data entry.

Consequently, using the method and system for creating customer lists and customer profiles using mobile computing systems, discussed herein, small business owners, or other merchants and/or product marketers, can more easily and reliably add customers to their customer lists and create customer profiles for those customers using mobile computing system technology to more effectively target customers and create more effective marketing devices.

As discussed in more detail below, using the below embodiments, with little or no modification and/or user input, there is considerable flexibility, adaptability, and opportunity for customization to meet the specific needs of various users under numerous circumstances.

Figure 1:
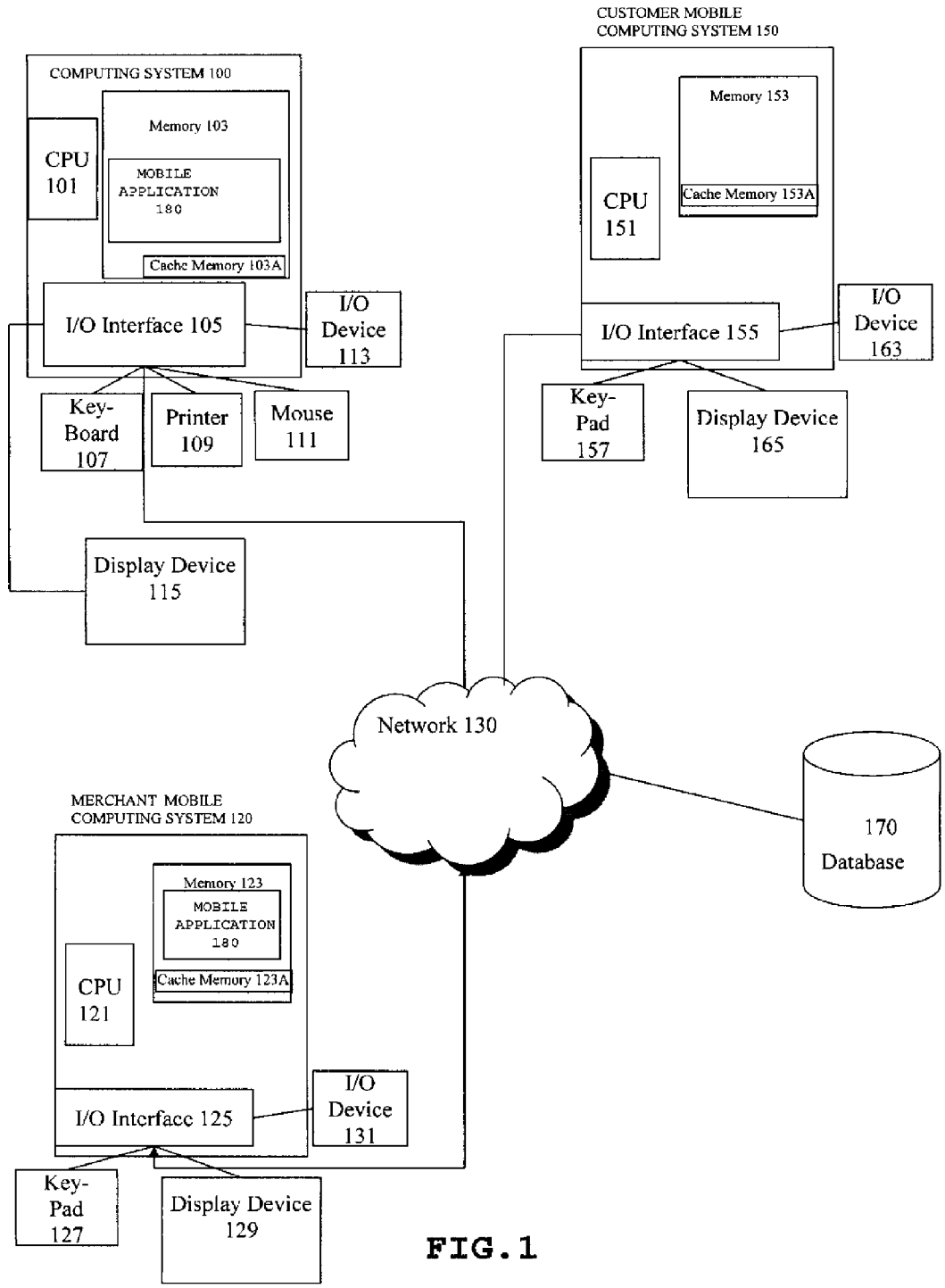
FIG. 1 is a block diagram of an exemplary hardware architecture for implementing one embodiment including a computing system, a mobile computing system; a communication network, and a database, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

Hardware Architecture

In accordance with one embodiment, a method and system for creating customer lists and customer profiles using mobile computing systems includes a process for creating customer lists and customer profiles using mobile computing systems whereby, in one embodiment, a mobile customer database is provided that includes a listing of one or more potential mobile customers and mobile computing system contact information for the potential mobile customers. In one embodiment, at least part of the mobile customer database data is provided by the one or more potential mobile customers sending their contact information, such as a mobile phone number, and a keyword, via a Short Message Service (SMS) message to a customizable virtual mobile number, i.e., a long code or short code, that a merchant and/or product marketer has posted. In one embodiment, a mobile computing system based marketing device, such as a Short Message Service (SMS) message, is created by the merchant and/or product marketer through a mobile application. In one embodiment, the mobile computing system based marketing device is associated with one or more products and/or services and is designed to be distributed via mobile computing systems. In one embodiment, the mobile computing system based marketing device includes one or more "hooks" that are presented to the mobile customers to inquire about a given mobile customer's interest level in the products and/or services associated with the mobile computing system based marketing device and/or the specific offer made through the mobile computing system based marketing device. In one embodiment, the mobile computing system based marketing device is distributed to selected mobile customers in the mobile customer database via their mobile computing systems and/or any other customer computing systems. In one embodiment, one or more of the selected mobile customers who receive the mobile computing system based marketing device respond, or fail to respond, to the mobile computing system based marketing device by: providing a response to the one or more hooks provided in the mobile computing system based marketing device including, in one embodiment, responding to a hook requesting the mobile customer to send an SMS text message response to a customizable virtual mobile number associated with the merchant in order to receive a marketing device, such as a coupon or discount voucher; not providing a response to the one or more hooks provided in the mobile computing system based marketing device; accepting/redeeming the offer set forth in the mobile computing system based marketing device; and/or not accepting/redeeming the offer set forth in the mobile computing system based marketing device. In one embodiment, response data is then generated that represents respective responses, or lack of responses, of the selected mobile customers. In one embodiment, the response data is correlated to the respective selected mobile customers and/or the one or more products and/or services associated with mobile computing system based marketing device, and/or the offer specifics set forth in the mobile computing system based marketing device. In one embodiment, the response data is then stored in the mobile customer database and is used to create and/or update mobile customer profiles associated with the respective selected mobile customers in the mobile customer database. In one embodiment, the created/updated mobile customer profiles associated with the respective selected mobile customers in the mobile customer database are then used to determine which of the selected mobile customers will be sent subsequent mobile computing system based marketing devices and/or the terms of any mobile computing system based marketing devices to be sent to the selected mobile customers. In one embodiment, the created/updated mobile customer profiles associated with the respective selected mobile customers in the mobile customer database are also used to determine the effectiveness of the mobile computing system based marketing devices.

FIG. 1 is a block diagram of an exemplary hardware architecture for implementing one embodiment of a system and method for creating customer lists and customer profiles using mobile computing systems, such as exemplary process 300 discussed herein, that includes: a computing system 100, e.g., a first computing system; a merchant mobile computing system 120, e.g. a second computing system; a customer mobile computing system 150 e.g., a third computing system; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part of, a mobile application 180 for implementing at least part of a process for creating customer lists using mobile computing systems. In one embodiment, mobile application 180 is stored, in whole, or in part, in memory system 103, and is used by, associated with, or includes, as discussed below, a process for creating customer lists and customer profiles using mobile computing systems, such as exemplary process 300 discussed below.

Computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed.

In one embodiment, all, or part of a process for creating customer lists and customer profiles using mobile computing systems; a mobile application for implementing at least part of a process for creating customer lists and customer profiles using mobile computing systems; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles; is storied, in whole, or in part, in memory 103 of mobile computing system 100.

In one embodiment, all, or part of: a process for creating customer lists and customer profiles using mobile computing systems; mobile application 180 for implementing at least part of a process for creating customer lists and customer profiles using mobile computing systems; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles; are entered, in whole, or in part, into computing system 100 via I/O device 113, such as from a CD, DVD, floppy disk, portable hard drive, memory stick, download site, or other medium and/or computer program product as defined herein.

As used herein, the term "computing system" includes, but is not limited to: a desktop computing system/computer; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, computing system 100 is a computing system used and/or accessible by another computing system, such as merchant mobile computing system 120 and/or customer mobile computing system 150 (discussed below), that, in various embodiments, are, but are not limited to, a cellular telephone, a smart phone, a digital wireless telephone, a Personal Digital Assistant (PDA), a two-way pager, a mobile server computer, an Internet appliance, any other device, or any desired combination of these devices, that includes components that can execute all, or part, of a process for creating customer lists and customer profiles using mobile computing systems, in accordance with at least one of the embodiments as described herein.

In one embodiment, computing system 100 is associated with any, but not limited to, one or more of the following: a provider of the process for creating customer lists and customer profiles using mobile computing systems; a provider of a mobile application; one or more users; or any third party.

In one embodiment, computing system 100 is representative of two or more computing systems. In one embodiment, computing system 100 is a client computing system associated with one or more server computing systems. In one embodiment, computing system 100 is a server computing system that is, in turn, associated with one or more client computing systems. In one embodiment, computing system 100 is part of a cloud computing environment.

As also seen in FIG. 1, in one embodiment, merchant mobile computing system 120 can include a CPU 121, an input/output (I/O) interface 125, and a memory system 123, including cache memory 123A. In one embodiment, merchant mobile computing system 120 may further include standard user interface devices such as a keypad 127, a keyboard, and a display device 129, as well as, one or more standard input/output (I/O) devices 131, such as a compact disk (CD) or DVD drive, floppy disk drive, or other digital or waveform port, or other device capable of inputting data to, and outputting data from, merchant mobile computing system 120, whether available or known at the time of filing or as later developed.

In one embodiment, merchant mobile computing system 120 is representative of multiple mobile computing systems. As used herein, the term "mobile computing system" includes, but is not limited to: a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term mobile computing system, can denote, but is not limited to, computing systems made up of multiple: wireless devices; cellular telephones; digital telephones; two-way pagers; PDAs; media players; or any desired combination of these devices, that are coupled to perform the processes and/or operations as described herein.

In various embodiments, merchant mobile computing system 120 can be any mobile computing system as defined herein, and/or as known in the art at the time of filing, and/or as developed thereafter, that includes components that can execute all, or part, of a process for creating customer lists and customer profiles using mobile computing systems in accordance with at least one of the embodiments as described herein.

In one embodiment, memory system 123 includes all, or part of, mobile application 180 for implementing at least part of a process for creating customer lists using mobile computing systems. In one embodiment, mobile application 180 is stored, in whole, or in part, in memory system 123, and is used by, associated with, or includes, as discussed below, a process for creating customer lists and customer profiles using mobile computing systems, such as exemplary process 300 discussed below.

In one embodiment, all, or part of: electronic data representing a mobile computing system based marketing device, such as a Short Message Service (SMS) message, and/or a process for creating customer lists and customer profiles using mobile computing systems; can be loaded/transmitted, in whole, or in part, to merchant mobile computing system 120 from computing system 100 for storage in memory system 123 and/or cache memory 123A.

As also seen in FIG. 1, in one embodiment, customer mobile computing system 150 can include a CPU 151, an input/output (I/O) interface 155, and a memory system 153, including cache memory 153A. In one embodiment, customer mobile computing system 150 may further include standard user interface devices such as a keypad 157, a keyboard, and a display device 165, as well as, one or more standard input/output (I/O) devices 163, such as a compact disk (CD) or DVD drive, floppy disk drive, or other digital or waveform port, or other device capable of inputting data to, and outputting data from, customer mobile computing system 150, whether available or known at the time of filing or as later developed.

In one embodiment, customer mobile computing system 150 is representative of multiple user mobile computing systems. In various embodiments, customer mobile computing system 150 can be any mobile computing system as defined herein, and/or as known in the art at the time of filing, and/or as developed thereafter, that includes components that can execute all, or part, of a process for creating customer lists and customer profiles using mobile computing systems in accordance with at least one of the embodiments as described herein.

In one embodiment, all, or part of: electronic data representing a mobile computing system based marketing device, such as a Short Message Service (SMS) message, and/or a process for creating customer lists and customer profiles using mobile computing systems; can be loaded/transmitted, in whole, or in part, to customer mobile computing system 150 from computing system 100 and/or server system 120 and/or another data source, for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing system(s) 100 120 and/or 150, or a distributed database, or an external and/or portable hard drive. In one embodiment, database 170 is a dedicated mass storage device implemented in software, hardware, or a combination of hardware and software. In one embodiment, database 170 is a mobile customer database that includes data representing a listing of one or more potential mobile customers, mobile computing system contact information for the potential mobile customers, and/or mobile customer profiles for one or more potential mobile customers.

In addition, in one embodiment, all, or part of: a process for creating customer lists and customer profiles using mobile computing systems; a mobile application for implementing at least part of a process for creating customer lists and customer profiles using mobile computing systems; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles; are stored in whole, or in part, in database 170.

In one embodiment, database 170 is a web-based function. As discussed in more detail below, in one embodiment, database 170 is under the control of, or otherwise accessible by, a process for creating customer lists and customer profiles using mobile computing systems, and/or a mobile application implementing at least part of the process for creating customer lists and customer profiles using mobile computing systems. In one embodiment, database 170 is part of a cloud computing environment.

In one embodiment, computing systems 100, 120, and 150, and database 170, are coupled through network 130. In various embodiments, network 130 is any network, communications network, or network/communications network system such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Those of skill in the art will readily recognize that the components shown in FIG. 1, such as computing system 100, merchant mobile computing system 120, customer mobile computing system 150, and database 170, and their respective components, are shown for illustrative purposes only and that architectures with more or fewer components can implement, and benefit from, the invention. Moreover, one or more components of computing system 100, merchant mobile computing system 120, customer mobile computing system 150, and database 170, may be located remotely from their respective system and accessed via network, as discussed herein. In addition, the particular type of, and configuration of, computing system 100, merchant mobile computing system 120, customer mobile computing system 150, and database 170, are not relevant.

As discussed in more detail below, in one embodiment, a process for creating customer lists and customer profiles using mobile computing systems; a mobile application for implementing at least part of a process for creating customer lists and customer profiles using mobile computing systems; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles are stored, in whole, or in part, in memory system 103 and/or cache memory 103A, of computing system 100, and/or memory system 123 and/or cache memory 123A of merchant mobile computing system 150, and/or memory system 153 and/or cache memory 153A of customer mobile computing system 150, and/or in database 170, and executed on computing system 100, and/or merchant mobile computing system 120, and/or customer mobile computing system 150. As used herein, a memory refers to a volatile memory, a non-volatile memory, or any combination of the two.

Although a process for creating customer lists and customer profiles using mobile computing systems, such as process for creating customer lists and customer profiles using mobile computing systems 300, and/or a mobile application for implementing at least part of a process for creating customer lists and customer profiles using mobile computing systems, such as mobile application 180, are sometimes referred to herein, alternatively, as a process, an application, a module, a program, a component of a software system, a component of a software package, a component of a parent system, a plug-in, or a feature of a parent system, this terminology is illustrative only. In some embodiments, a process for creating customer lists and customer profiles using mobile computing systems, such as process for creating customer lists and customer profiles using mobile computing systems 300, and/or a mobile application for implementing at least part of a process for creating customer lists and customer profiles using mobile computing systems, such as mobile application 180, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101, 121, and 151. In one embodiment, execution of a process by CPU 101, CPU 121, and/or CPU 151, results in the operations of an agent computer process (not shown) and/or a rule computer process (not shown).

In one embodiment, a process for creating customer lists and customer profiles using mobile computing systems; a mobile application for implementing at least part of a process for creating customer lists and customer profiles using mobile computing systems; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles are computer applications or processes and/or data implemented and/or run and/or stored, in full, or in part, in, or on, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, and signals transmitted over a network, such as network 130 of FIG. 1, or other media or process capable of delivering computer readable data representing computer readable code, whether available or known at the time of filing or as later developed. This medium may belong to a computing system, such as computing system 100, merchant mobile computing system 120, and customer mobile computing system 150 of FIG. 1, described above. However, in some embodiments, the medium also may be removable and/or remote from the computing system.

For example, all, or part, of a process for creating customer lists and customer profiles using mobile computing systems; a mobile application for implementing at least part of a process for creating customer lists and customer profiles using mobile computing systems; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles may be stored in a memory that is physically located in a location, such as a server system memory, or database 170, of FIG. 1, different from a computing system, such as computing system 100, merchant mobile computing system 120 and customer mobile computing system 150 of FIG. 1, utilizing a process for creating customer lists and customer profiles using mobile computing systems; mobile application 180 for implementing at least part of a process for creating customer lists and customer profiles using mobile computing systems; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles.

In one embodiment, all, or part, of a process for creating customer lists and customer profiles using mobile computing systems; a mobile application for implementing at least part of a process for creating customer lists and customer profiles using mobile computing systems; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles are stored separate from the computing system's processor(s), such as CPUs 101, CPUs 121, and 151 of FIG. 1, and the computing system CPUs can be coupled to the memory in a client-server system, or, alternatively, via connection to another computer, such as computing system 100, merchant mobile computing system 120 and customer mobile computing system 150 of FIG. 1, via modems and analog lines, digital interfaces and a digital carrier line, or wireless or cellular connections.

In one embodiment, the computing systems and/or server systems, such as computing system 100, and/or merchant mobile computing system 120, and/or customer mobile computing system 150 of FIG. 1, running and/or utilizing and/or storing all, or part, of a process for creating customer lists and customer profiles using mobile computing systems; mobile application 180 for implementing at least part of a process for creating customer lists and customer profiles using mobile computing systems; data representing a listing of one or more potential mobile customers and mobile computing system contact information for the potential mobile customers; data representing one or more mobile computing system based marketing devices and/or hooks within one or more mobile computing system based marketing devices; response data representing responses to one or more mobile computing system based marketing devices and/or hooks within one or more mobile computing system based marketing devices; data representing one or more mobile customer profiles; and/or various analysis data associated with one or more mobile customer profiles; is a portable computer, a workstation, a two-way pager, a cellular telephone, a smart phone, a digital wireless telephone, a PDA, a server computer, an Internet appliance, or any other device that includes components that can execute all, or part, of a process for creating customer lists and customer profiles using mobile computing systems and/or mobile application 180 for implementing at least part of a process for creating customer lists and customer profiles using mobile computing systems, in accordance with at least one of the embodiments as described herein. Similarly, in another embodiment, a process for creating customer lists and customer profiles using mobile computing systems, and/or a mobile application for implementing at least part of a process for creating customer lists and customer profiles using mobile computing systems, such as mobile application 180, may be implemented on, and/or run on/by, and/or stored on, a computing system and/or server system that is comprised of multiple different computers, wireless devices, cellular telephones, digital telephones, two-way pagers, personal digital assistants, server computers, or any desired combination of these devices, that are coupled to perform the processes and/or operations as described herein.

Figure 2:
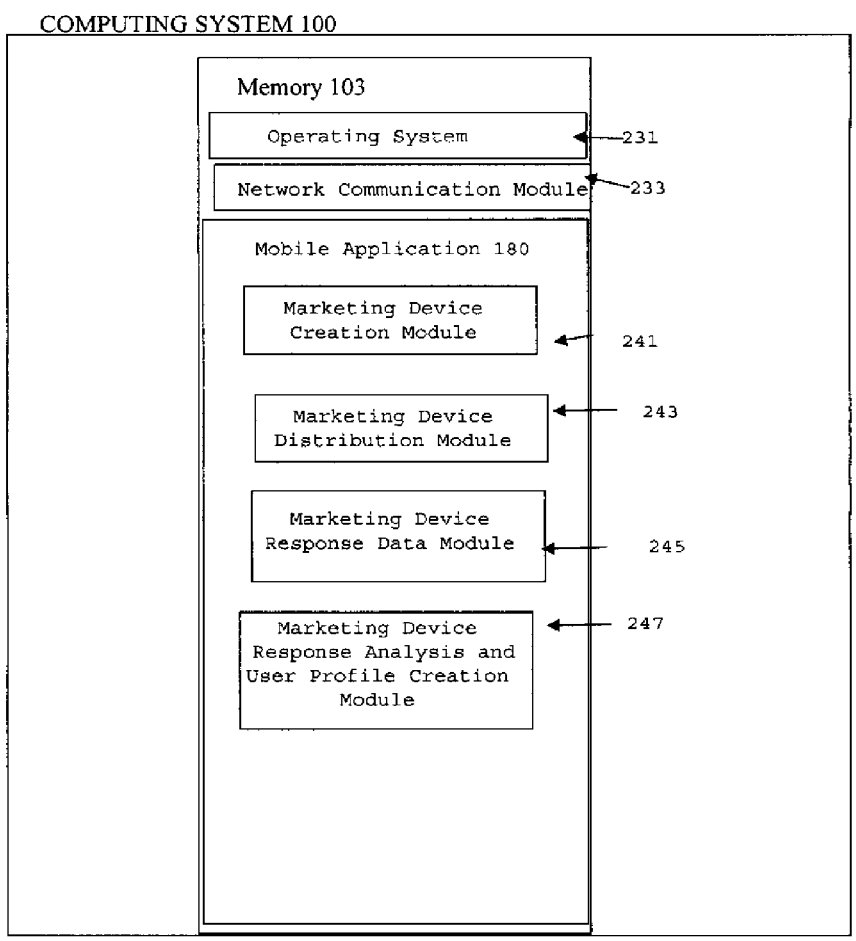
FIG. 2 is a block diagram of a exemplary memory system associated with the computing system of FIG. 1, in accordance with one embodiment.

FIG. 2 is a more detailed block diagram of memory system 103 of computing system 100 of FIG. 1. As seen in FIG. 2, memory system 103 can store data and/or instructions associated with, but not limited to, the following elements, subsets of elements, and/or super sets of elements for processing by one or more processors: operating system 231 that includes procedures, data, and/or instructions for handling various services and performing/coordinating hardware dependent tasks; network communications module 233 that includes procedures, data, and/or instructions, for connecting computing system 100 to other computing systems, such as other computing systems 100, and/or merchant mobile computing system 120 of FIG. 1, and/or customer mobile computing system 150 of FIG. 1, and/or a network, such as network 130 of FIG. 1, and/or a database, such as database 170 of FIG. 1; and mobile application module 180 that includes procedures, data, and/or instructions, associated with a mobile application for implementing at least part of a process for creating customer lists using mobile computing systems.

As also seen in FIG. 2, mobile application module 180 includes marketing device creation module 241 that includes procedures, data, and/or instructions, associated with creating one or more mobile computing system based marketing devices, such as an Short Message Service (SMS) message, that is associated with one or more products and/or services and includes one or more hooks that are presented to the mobile customers as part of the mobile computing system based marketing device.

As also seen in FIG. 2, in one embodiment, mobile application module 180 includes marketing device distribution module 243 that includes procedures, data, and/or instructions, for distributing the one or more mobile computing system based marketing devices of marketing device creation module 241 to selected mobile customers via their mobile computing systems and/or one or more mobile computing system networks.

As also seen in FIG. 2, in one embodiment, mobile application module 180 includes marketing device response data module 245 that includes procedures, data, and/or instructions, associated with monitoring, obtaining, generating, and storing response data of the selected mobile customers that receive the one or more mobile computing system based marketing devices of marketing device creation module 241 via marketing device distribution module 243 including, but not limited to, data indicating: whether or not a given mobile customer was interested in the product and/or service that was the subject of the mobile computing system based marketing device; whether or not a given mobile customer was interested in the terms of the offer that was provided via the mobile computing system based marketing device; any mobile customers that do not wish to be sent future mobile computing system based marketing devices associated with product and/or service that was the subject of the mobile computing system based marketing device; any mobile customers that do wish to be sent future mobile computing system based marketing devices associated with product and/or service that was the subject of the mobile computing system based marketing device; if the mobile computing system based marketing devices are reaching the mobile customers; any mobile customers that indicate an interest in the offer that was provided via the mobile computing system based marketing device but then failed to use/redeem the offer; any mobile customers that failed indicate an interest in the offer that was provided via the mobile computing system based marketing device but did use/redeem the offer; how many, or a percentage of, mobile customers responded at all to the mobile computing system based marketing device; and/or any other response data that is desired by the given merchant and that can be obtained using a mobile computing system based marketing device and one or more hooks.

As also seen in FIG. 2, in one embodiment, mobile application module 180 includes marketing device response analysis and user profile creation module 247 that includes procedures, data, and/or instructions, associated with obtaining, analyzing, creating and storing mobile customer profile in a mobile customer profile account for the selected mobile customer in a mobile customer database and/or to update an existing profile account previously created for the selected mobile customer in the mobile customer database. In one embodiment, marketing device response analysis and user profile creation module 247 includes procedures, data, and/or instructions, associated with analyzing the mobile customer profile data to determine one or more of, but not limited to, the following: which of the selected mobile customers will be sent subsequent mobile computing system based marketing devices; the terms of any mobile computing system based marketing devices to be sent to the selected mobile customers; the effectiveness of the mobile computing system based marketing devices; the desirability of the one or more products and/or services that are the subject of the mobile computing system based marketing devices; any other mobile customer, product and/or service data, and/or marketing data desired by the merchant and/or product marketer that can be determined by the correlated response data for each selected mobile customer using any methods, means, mechanisms, procedures and/or processes discussed herein, and/or known in the art at the time of filing, and/or as developed after the time of filing.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

Process

In accordance with one embodiment, a method and system for creating customer lists and customer profiles using mobile computing systems includes a process for creating customer lists and customer profiles using mobile computing systems whereby, in one embodiment, a mobile customer database is provided that includes a listing of one or more potential mobile customers and mobile computing system contact information for the potential mobile customers. In one embodiment, at least part of the mobile customer database data is provided by the one or more potential mobile customers sending their contact information, such as a mobile phone number, and a keyword, via a Short Message Service (SMS) message to a customizable virtual mobile number, i.e., a long code or short code, that a merchant and/or product marketer has posted. In one embodiment, a mobile computing system based marketing device, such as a Short Message Service (SMS) message, is created by the merchant and/or product marketer through a mobile application. In one embodiment, the mobile computing system based marketing device is associated with one or more products and/or services and is designed to be distributed via mobile computing systems. In one embodiment, the mobile computing system based marketing device includes one or more "hooks" that are presented to the mobile customers to inquire about a given mobile customer's interest level in the products and/or services associated with the mobile computing system based marketing device and/or the specific offer made through the mobile computing system based marketing device. In one embodiment, the mobile computing system based marketing device is distributed to selected mobile customers in the mobile customer database via their mobile computing systems and/or any other customer computing systems. In one embodiment, one or more of the selected mobile customers who receive the mobile computing system based marketing device respond, or fail to respond, to the mobile computing system based marketing device by: providing a response to the one or more hooks provided in the mobile computing system based marketing device including, in one embodiment, responding to a hook requesting the mobile customer to send an SMS text message response to a customizable virtual mobile number associated with the merchant in order to receive a marketing device, such as a coupon or discount voucher; not providing a response to the one or more hooks provided in the mobile computing system based marketing device; accepting/redeeming the offer set forth in the mobile computing system based marketing device; and/or not accepting/redeeming the offer set forth in the mobile computing system based marketing device. In one embodiment, response data is then generated that represents respective responses, or lack of responses, of the selected mobile customers. In one embodiment, the response data is correlated to the respective selected mobile customers and/or the one or more products and/or services associated with mobile computing system based marketing device, and/or the offer specifics set forth in the mobile computing system based marketing device. In one embodiment, the response data is then stored in the mobile customer database and is used to create and/or update mobile customer profiles associated with the respective selected mobile customers in the mobile customer database. In one embodiment, the created/updated mobile customer profiles associated with the respective selected mobile customers in the mobile customer database are then used to determine which of the selected mobile customers will be sent subsequent mobile computing system based marketing devices and/or the terms of any mobile computing system based marketing devices to be sent to the selected mobile customers. In one embodiment, the created/updated mobile customer profiles associated with the respective selected mobile customers in the mobile customer database are also used to determine the effectiveness of the mobile computing system based marketing devices.

Figure 3:
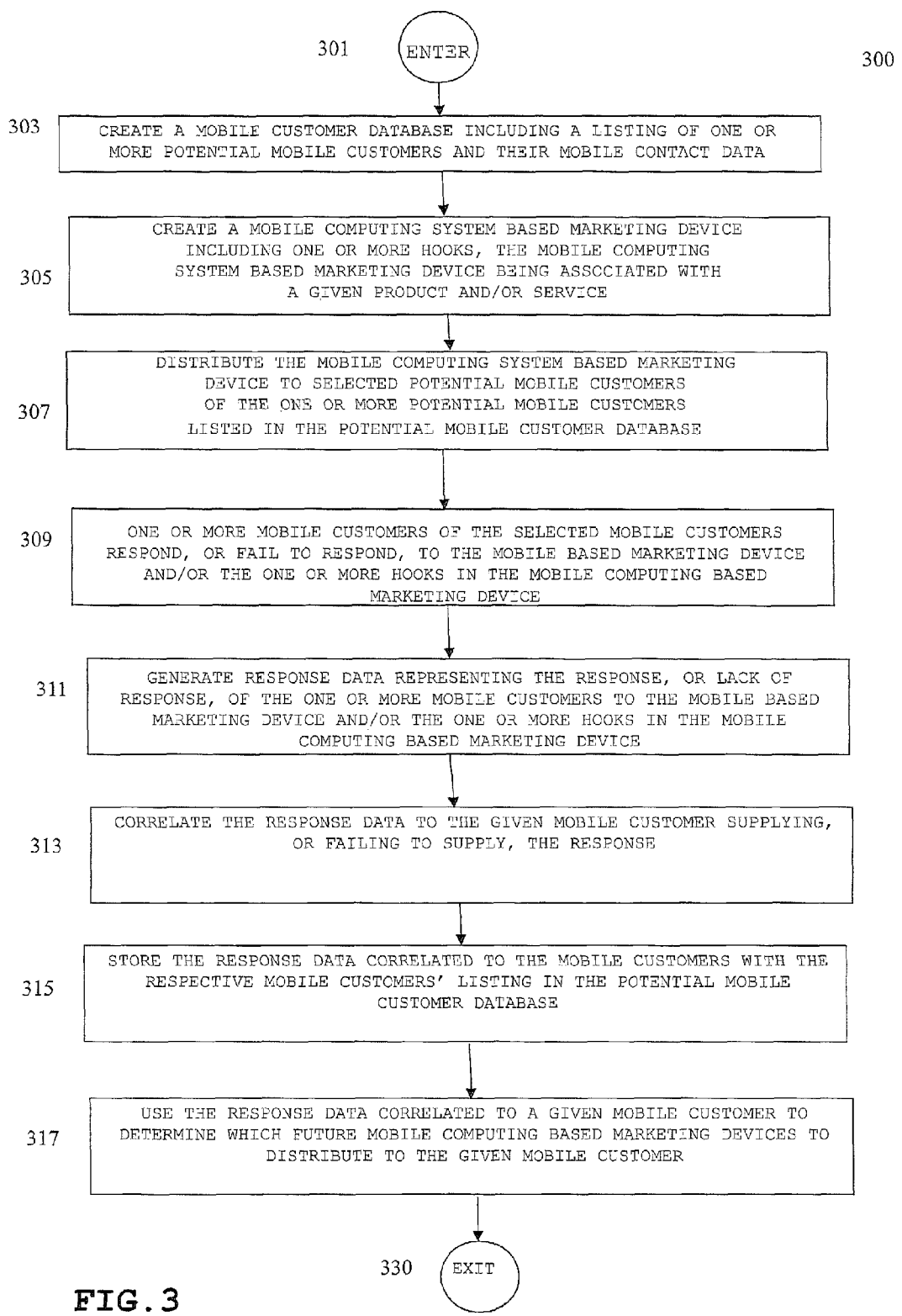
FIG. 3 is a flow chart depicting a process for creating customer lists and customer profiles using mobile computing systems in accordance with one embodiment.

FIG. 3 is a flow chart depicting a process for creating customer lists and customer profiles using mobile computing systems 300 in accordance with one embodiment. Process for creating customer lists and customer profiles using mobile computing systems 300 begins at ENTER OPERATION 301 of FIG. 3 and process flow proceeds to CREATE A MOBILE CUSTOMER DATABASE INCLUDING A LISTING OF ONE OR MORE POTENTIAL MOBILE CUSTOMERS AND THEIR MOBILE CONTACT DATA OPERATION 303.

In one embodiment, at CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 a mobile customer database is provided that includes a listing of one or more potential mobile customers and mobile computing system contact information for the potential mobile customers.

In one embodiment, at CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 the mobile customer database is a data storage device, such as database 170 of FIG. 1, a designated server system or computing system, such as computing system 100 of FIG. 1, or a designated portion of one or more server systems or computing systems, such as computing system 100 of FIG. 1, and/or merchant mobile computing system 120 of FIG. 1, and/or customer mobile computing system 150 of FIG. 1, or a distributed database, or an external and/or portable hard drive. In one embodiment, the mobile customer database is a dedicated mass storage device implemented in software, hardware, or a combination of hardware and software. In one embodiment, the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 is a web-based function. In various embodiments, the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 is any data storage mechanism, means, process and/or procedure, as discussed herein, and/or as known in the art at the time of filing, and/or as developed after the time of filing.

Returning to FIG. 3, in one embodiment, at least part of the initial listing of one or more potential mobile customers and mobile computing system contact information for the potential mobile customers in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 is obtained by a given merchant signing up and/or creating an account with a mobile application/system, such a mobile application 180 of FIG. 1, and creating a customizable virtual mobile number, i.e., a long code or short code.

Herein, the term "long code" includes a reception mechanism often used by businesses to receive SMS messages and voice calls. Long codes are typically internationally available and enable businesses to have their own number, rather than short codes which are generally shared across a lot of brands.

Returning to FIG. 3, in one embodiment, the given merchant then posts, or otherwise provides to customers and/or potential customers, their customizable virtual mobile number and informs the customers and/or potential customers that if they text their mobile contact information, such as a mobile telephone number, and in one embodiment, a defined keyword or character string, to the posted customizable virtual mobile number, their mobile contact information will be added to the listing of one or more potential mobile customers in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 and/or the customers and/or potential customers will become eligible for special offers in the form of one or more mobile computing system based marketing devices.

Using this particular method of obtaining at least part of the initial listing of one or more potential mobile customers and mobile computing system contact information for the potential mobile customers in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 is advantageous in that the given merchant can create and/or increase their customer list with minimal effort on the part of both the given merchant and the potential customer by allowing potential mobile customers themselves to populate their own information through their texting of the information to the customizable virtual mobile number that the given merchant has posted, for instance, in their storefront. In addition, the potential customers so acquired have already shown at least some interest in the product and/or service being offered by the given merchant by virtue of the fact they have taken the proactive action to add themselves to the potential customer list through their texting of the information to the customizable virtual mobile number.

In various other embodiments, at least part of the initial listing of one or more potential mobile customers and mobile computing system contact information for the potential mobile customers in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 is obtained using any method, means, process and/or procedure for obtaining a list of one or more potential mobile customers and mobile computing system contact information for the potential mobile customers, as discussed herein, and/or as known in the art at the time of filing, and/or as developed after the time of filing.

In one embodiment, once a mobile customer database is provided that includes a listing of one or more potential mobile customers and mobile computing system contact information for the potential mobile customers at CREATE A MOBILE CUSTOMER DATABASE INCLUDING A LISTING OF ONE OR MORE POTENTIAL MOBILE CUSTOMERS AND THEIR MOBILE CONTACT DATA OPERATION 303, process flow proceeds to CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305.

In one embodiment, at CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 a mobile computing system based marketing device, such as a Short Message Service (SMS) message, is created by the merchant and/or product marketer through a mobile application. In one embodiment, at CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 the mobile computing system based marketing device includes one or more "hooks" that are presented to the mobile customers to inquire about a given mobile customer's interest level in the products and/or services associated with the mobile computing system based marketing device and/or the specific offer made through the mobile computing system based marketing device.

In one embodiment, at CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 a mobile application, such as mobile application 180 of FIGS. 1 and 2, is accessed by the merchant using any computing system, such as merchant computing system 120 of FIG. 1, and/or as discussed herein, and/or as known in the art at the time of filing, and/or as developed after the time of filing. In one embodiment, the merchant creates a mobile computing system based marketing device, such as an Short Message Service (SMS) message, that is associated with one or more products and/or services through the mobile application. In one embodiment, the mobile computing system based marketing device is designed to be distributed via mobile computing systems.

Returning to FIG. 3, in one embodiment, the mobile computing system based marketing device is created through a specialized mobile application, such as mobile application 180 of FIGS. 1 and 2, that is a marketing tool for small business owners and is offered by a third party.

In one embodiment, the mobile computing system based marketing device of CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 includes customizable content. In one embodiment, the customizable content takes the form of the one or more hooks. In one embodiment, the one or more hooks are presented to the mobile customers as part of the mobile computing system based marketing device and appear within the computing system based marketing device, for instance, at the beginning, or end, of the computing system based marketing device.

As a specific illustrative example, in one embodiment, the one or more hooks are presented to the mobile customers on the bottom of an SMS mobile computing system based marketing device and request the mobile customer to send an SMS text message response to a customizable virtual mobile number associated with the merchant in order to receive a marketing device, such as a coupon or discount voucher or any other marketing device as discussed herein, and/or as known in the art at the time of filing, and/or as developed after the time of filing.

Herein, the term "marketing device" is used to denote any advertisements, coupons, discount certificates, discount vouchers, sales offers, and/or any other marketing tool and/or device and/or offer that is presented, and/or offered to, and/or obtained by, any customer/consumer in any format.

As another specific illustrative example, in one embodiment, the one or more hooks are presented to the mobile customers on the bottom of an SMS mobile computing system based marketing device to inquire about the mobile customer's interest level in the product and/or service and/or specific offer. In one specific example, the mobile customer is encouraged to SMS back to the customizable virtual mobile number the mobile customer's interest level in the offer set forth in the particular mobile computing system based marketing device via a rating. As an example, the customer can send "1" to show they want to redeem the offer set forth in the particular mobile computing system based marketing device, or "2" to say they do not want to redeem the offer set forth in the particular mobile computing system based marketing device.

In various embodiments, the mobile computing system based marketing device of CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 and/or one or more hooks are further customizable to meet the specific needs of the given merchant and/or a given potential mobile customer.

In one embodiment, once a mobile computing system based marketing device, such as a Short Message Service (SMS) message, is created by the merchant and/or product marketer through a mobile application that is associated with one or more products and/or services and includes one or more hooks that are presented to the mobile customers to inquire about a given mobile customer's interest level in the products and/or services associated with the mobile computing system based marketing device and/or the specific offer made through the mobile computing system based marketing device at CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 process flow proceeds to DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307.

In one embodiment, at DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 the mobile computing system based marketing device of CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 is distributed to selected mobile customers in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 via their mobile computing systems and/or any other customer computing systems.

In one embodiment, at DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 the mobile computing system based marketing device is distributed to selected mobile customers via their mobile computing systems, such as customer mobile computing system 150 of FIG. 1, and/or one or more mobile computing system networks such as, network 130 of FIG. 1 and/or including, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

Returning to FIG. 3, in one embodiment, at DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 the mobile computing system based marketing device is distributed to selected mobile customers via their mobile computing systems in the form of an SMS or other text message.

In one embodiment, at DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 the mobile computing system based marketing device is distributed to selected mobile customers that includes all mobile customers in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303.

In one embodiment, at DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 the mobile computing system based marketing device is distributed to selected mobile customers that are a sub-set of all the mobile customers in the mobile customer database CREATE A MOBILE CUSTOMER DATABASE INCLUDING A LISTING OF ONE OR MORE POTENTIAL MOBILE CUSTOMERS AND THEIR MOBILE CONTACT DATA OPERATION 303.

In one embodiment, at DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 the mobile computing system based marketing device is distributed to selected mobile customers that is a super-set of mobile customers including all the mobile customers in the mobile customer database CREATE A MOBILE CUSTOMER DATABASE INCLUDING A LISTING OF ONE OR MORE POTENTIAL MOBILE CUSTOMERS AND THEIR MOBILE CONTACT DATA OPERATION 303.

In one embodiment, once the mobile computing system based marketing device of CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 is distributed to selected mobile customers in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 via their mobile computing systems and/or any other customer computing systems at DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 process flow proceeds to ONE OR MORE MOBILE CUSTOMERS OF THE SELECTED MOBILE CUSTOMERS RESPOND, OR FAIL TO RESPOND, TO THE MOBILE BASED MARKETING DEVICE AND/OR THE ONE OR MORE HOOKS IN THE MOBILE COMPUTING BASED MARKETING DEVICE OPERATION 309.

In one embodiment, at ONE OR MORE MOBILE CUSTOMERS OF THE SELECTED MOBILE CUSTOMERS RESPOND, OR FAIL TO RESPOND, TO THE MOBILE BASED MARKETING DEVICE AND/OR THE ONE OR MORE HOOKS IN THE MOBILE COMPUTING BASED MARKETING DEVICE OPERATION 309 one or more of the selected mobile customers of DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 who receive the mobile computing system based marketing device of CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 respond, or fail to respond, to the mobile computing system based marketing device.

In one embodiment, at ONE OR MORE MOBILE CUSTOMERS OF THE SELECTED MOBILE CUSTOMERS RESPOND, OR FAIL TO RESPOND, TO THE MOBILE BASED MARKETING DEVICE AND/OR THE ONE OR MORE HOOKS IN THE MOBILE COMPUTING BASED MARKETING DEVICE OPERATION 309 one or more of the selected mobile customers of DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 who receive the mobile computing system based marketing device of CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 respond, or fail to respond, to the mobile computing system based marketing device by: providing a response to the one or more hooks provided in the mobile computing system based marketing device including, in one embodiment, responding to a hook requesting the mobile customer to send an SMS text message response to a customizable virtual mobile number associated with the merchant in order to receive a marketing device, such as a coupon or discount voucher; not providing a response to the one or more hooks provided in the mobile computing system based marketing device; accepting/redeeming the offer set forth in the mobile computing system based marketing device; and/or not accepting/redeeming the offer set forth in the mobile computing system based marketing device.

In one embodiment, once one or more of the selected mobile customers of DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 who receive the mobile computing system based marketing device of CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 respond, or fail to respond, to the mobile computing system based marketing device at ONE OR MORE MOBILE CUSTOMERS OF THE SELECTED MOBILE CUSTOMERS RESPOND, OR FAIL TO RESPOND, TO THE MOBILE BASED MARKETING DEVICE AND/OR THE ONE OR MORE HOOKS IN THE MOBILE COMPUTING BASED MARKETING DEVICE OPERATION 309 process flow proceeds to GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311.

In one embodiment, at GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 the responses of the selected mobile customers of ONE OR MORE MOBILE CUSTOMERS OF THE SELECTED MOBILE CUSTOMERS RESPOND, OR FAIL TO RESPOND, TO THE MOBILE BASED MARKETING DEVICE AND/OR THE ONE OR MORE HOOKS IN THE MOBILE COMPUTING BASED MARKETING DEVICE OPERATION 309 are monitored and response data is generated that represents respective responses, or lack of responses, of the selected mobile customers.

In one embodiment, at GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 the responses, or lack of responses, from one or more of the selected mobile customers who receive the mobile computing system based marketing device are tracked and/or monitored by one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application.

Returning to FIG. 3, in one embodiment, at GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 one or more of the selected mobile customers who receive the mobile computing system based marketing device may be deemed to respond to the mobile computing system based marketing device by providing a response to the one or more hooks provided in the mobile computing system based marketing device.

In one embodiment, at GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 one or more of the selected mobile customers who receive the mobile computing system based marketing device may be deemed to respond to the mobile computing system based marketing device by not providing a response to the one or more hooks provided in the mobile computing system based marketing device.

In one embodiment, at GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 one or more of the selected mobile customers who receive the mobile computing system based marketing device may be deemed to respond to the mobile computing system based marketing device by accepting/redeeming the offer set forth in the mobile computing system based marketing device.

In one embodiment, at GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 one or more of the selected mobile customers who receive the mobile computing system based marketing device may be deemed to respond to the mobile computing system based marketing device by not accepting/redeeming the offer set forth in the mobile computing system based marketing device.

In one embodiment, at GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 response data is generated by one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application.

Returning to FIG. 3, in one embodiment, at GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 the response data generated includes, but is not limited to: whether or not a given mobile customer was interested in the product and/or service that was the subject of the mobile computing system based marketing device; whether or not a given mobile customer was interested in the terms of the offer that was provided via the mobile computing system based marketing device; any mobile customers that do not wish to be sent future mobile computing system based marketing devices associated with product and/or service that was the subject of the mobile computing system based marketing device; any mobile customers that do wish to be sent future mobile computing system based marketing devices associated with product and/or service that was the subject of the mobile computing system based marketing device; if the mobile computing system based marketing devices are reaching the mobile customers; any mobile customers that indicate an interest in the offer that was provided via the mobile computing system based marketing device but then failed to use/redeem the offer; any mobile customers that failed indicate an interest in the offer that was provided via the mobile computing system based marketing device but did use/redeem the offer; how many, or a percentage of, mobile customers responded at all to the mobile computing system based marketing device; and/or any other response data that is desired by the given merchant and that can be obtained using a mobile computing system based marketing device and one or more hooks.

In one embodiment, once the responses of the selected mobile customers of ONE OR MORE MOBILE CUSTOMERS OF THE SELECTED MOBILE CUSTOMERS RESPOND, OR FAIL TO RESPOND, TO THE MOBILE BASED MARKETING DEVICE AND/OR THE ONE OR MORE HOOKS IN THE MOBILE COMPUTING BASED MARKETING DEVICE OPERATION 309 are monitored and response data is generated that represents respective responses, or lack of responses, of the selected mobile customers at GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311, process flow proceeds to CORRELATE THE RESPONSE DATA TO THE GIVEN MOBILE CUSTOMER SUPPLYING, OR FAILING TO SUPPLY, THE RESPONSE OPERATION 313.

In one embodiment, at CORRELATE THE RESPONSE DATA TO THE GIVEN MOBILE CUSTOMER SUPPLYING, OR FAILING TO SUPPLY, THE RESPONSE OPERATION 313 the response data of GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 is correlated to the respective selected mobile customers of DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 and/or the one or more products and/or services associated with mobile computing system based marketing device, and/or the offer specifics set forth in the mobile computing system based marketing device of CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305.

In one embodiment, at CORRELATE THE RESPONSE DATA TO THE GIVEN MOBILE CUSTOMER SUPPLYING, OR FAILING TO SUPPLY, THE RESPONSE OPERATION 313 the response data of GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 is correlated to the respective selected mobile customers associated with the response data by, and/or under the direction of, one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application.

Returning to FIG. 3, in one embodiment, at CORRELATE THE RESPONSE DATA TO THE GIVEN MOBILE CUSTOMER SUPPLYING, OR FAILING TO SUPPLY, THE RESPONSE OPERATION 313 the response data of GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 is correlated to the respective one or more products and/or services associated with mobile computing system based marketing device by, and/or under the direction of, one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application.

Returning to FIG. 3, in one embodiment, at CORRELATE THE RESPONSE DATA TO THE GIVEN MOBILE CUSTOMER SUPPLYING, OR FAILING TO SUPPLY, THE RESPONSE OPERATION 313 the response data of GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 the response data is correlated to the respective offer specifics set forth in the mobile computing system based marketing device by, and/or under the direction of, one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application.

Returning to FIG. 3, in one embodiment, once the response data of GENERATE RESPONSE DATA REPRESENTING THE RESPONSE, OR LACK OF RESPONSE, OF THE ONE OR MORE MOBILE CUSTOMERS TO THE MOBILE BASED MARKETING DEVICE AND/OR THE ONE OR MORE HOOKS IN THE MOBILE COMPUTING BASED MARKETING DEVICE OPERATION 311 is correlated to the respective selected mobile customers of DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 and/or the one or more products and/or services associated with mobile computing system based marketing device, and/or the offer specifics set forth in the mobile computing system based marketing device of CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 at CORRELATE THE RESPONSE DATA TO THE GIVEN MOBILE CUSTOMER SUPPLYING, OR FAILING TO SUPPLY, THE RESPONSE OPERATION 313 process flow proceeds to STORE THE RESPONSE DATA CORRELATED TO THE MOBILE CUSTOMERS WITH THE RESPECTIVE MOBILE CUSTOMER'S' LISTING IN THE POTENTIAL MOBILE CUSTOMER DATABASE OPERATION 315.

In one embodiment, at STORE THE RESPONSE DATA CORRELATED TO THE MOBILE CUSTOMERS WITH THE RESPECTIVE MOBILE CUSTOMER'S' LISTING IN THE POTENTIAL MOBILE CUSTOMER DATABASE OPERATION 315 the correlated response data of CORRELATE THE RESPONSE DATA TO THE GIVEN MOBILE CUSTOMER SUPPLYING, OR FAILING TO SUPPLY, THE RESPONSE OPERATION 313 is stored in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 and is used to create and/or update mobile customer profiles associated with the respective selected mobile customers in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303.

In one embodiment, at STORE THE RESPONSE DATA CORRELATED TO THE MOBILE CUSTOMERS WITH THE RESPECTIVE MOBILE CUSTOMER'S' LISTING IN THE POTENTIAL MOBILE CUSTOMER DATABASE OPERATION 315 the correlated response data for each selected mobile customer of DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 is stored in a mobile customer profile account for the selected mobile customer created in the mobile customer database.

In one embodiment, MOBILE CUSTOMER WITH THE RESPECTIVE MOBILE CUSTOMER'S LISTING IN THE POTENTIAL MOBILE CUSTOMER DATABASE OPERATION 315 the correlated response data for each selected mobile customer of DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 is used to update an existing profile account previously created for the selected mobile customer in the mobile customer database.

In one embodiment, once the correlated response data of CORRELATE THE RESPONSE DATA TO THE GIVEN MOBILE CUSTOMER SUPPLYING, OR FAILING TO SUPPLY, THE RESPONSE OPERATION 313 is stored in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 and is used to create and/or update mobile customer profiles associated with the respective selected mobile customers in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 at STORE THE RESPONSE DATA CORRELATED TO THE MOBILE CUSTOMERS WITH THE RESPECTIVE MOBILE CUSTOMER'S' LISTING IN THE POTENTIAL MOBILE CUSTOMER DATABASE OPERATION 315, process flow proceeds to USE THE RESPONSE DATA CORRELATED TO A GIVEN MOBILE CUSTOMER TO DETERMINE WHICH FUTURE MOBILE COMPUTING BASED MARKETING DEVICES TO DISTRIBUTE TO THE GIVEN MOBILE CUSTOMER OPERATION 317.

In one embodiment, at USE THE RESPONSE DATA CORRELATED TO A GIVEN MOBILE CUSTOMER TO DETERMINE WHICH FUTURE MOBILE COMPUTING BASED MARKETING DEVICES TO DISTRIBUTE TO THE GIVEN MOBILE CUSTOMER OPERATION 317 the created/updated mobile customer profiles of STORE THE RESPONSE DATA CORRELATED TO THE MOBILE CUSTOMERS WITH THE RESPECTIVE MOBILE CUSTOMER'S' LISTING IN THE POTENTIAL MOBILE CUSTOMER DATABASE OPERATION 315 associated with the respective selected mobile customers of DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 are used to determine which of the selected mobile customers will be sent subsequent mobile computing system based marketing devices and/or the terms of any mobile computing system based marketing devices to be sent to the selected mobile customers.

In one embodiment, at USE THE RESPONSE DATA CORRELATED TO A GIVEN MOBILE CUSTOMER TO DETERMINE WHICH FUTURE MOBILE COMPUTING BASED MARKETING DEVICES TO DISTRIBUTE TO THE GIVEN MOBILE CUSTOMER OPERATION 317 the correlated response data for each selected mobile customer and/or the selected mobile customers' profile data is analyzed by, and/or under the direction of, one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application.

Returning to FIG. 3, in one embodiment, at USE THE RESPONSE DATA CORRELATED TO A GIVEN MOBILE CUSTOMER TO DETERMINE WHICH FUTURE MOBILE COMPUTING BASED MARKETING DEVICES TO DISTRIBUTE TO THE GIVEN MOBILE CUSTOMER OPERATION 317 the correlated response data for each selected mobile customer and/or the selected mobile customers' profile data is analyzed by, and/or under the direction of, one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application, to determine which of the selected mobile customers will be sent subsequent mobile computing system based marketing devices.

Returning to FIG. 3, in one embodiment, at USE THE RESPONSE DATA CORRELATED TO A GIVEN MOBILE CUSTOMER TO DETERMINE WHICH FUTURE MOBILE COMPUTING BASED MARKETING DEVICES TO DISTRIBUTE TO THE GIVEN MOBILE CUSTOMER OPERATION 317 the correlated response data for each selected mobile customer and/or the selected mobile customers' profile data is analyzed by, and/or under the direction of, one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application, to determine the terms of any mobile computing system based marketing devices to be sent to the selected mobile customers Returning to FIG. 3.

Returning to FIG. 3, in one embodiment, at USE THE RESPONSE DATA CORRELATED TO A GIVEN MOBILE CUSTOMER TO DETERMINE WHICH FUTURE MOBILE COMPUTING BASED MARKETING DEVICES TO DISTRIBUTE TO THE GIVEN MOBILE CUSTOMER OPERATION 317 the correlated response data for each selected mobile customer and/or the selected mobile customers' profile data is analyzed by, and/or under the direction of, one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application, to determine the effectiveness of the mobile computing system based marketing devices.

Returning to FIG. 3, in one embodiment, at USE THE RESPONSE DATA CORRELATED TO A GIVEN MOBILE CUSTOMER TO DETERMINE WHICH FUTURE MOBILE COMPUTING BASED MARKETING DEVICES TO DISTRIBUTE TO THE GIVEN MOBILE CUSTOMER OPERATION 317 the correlated response data for each selected mobile customer and/or the selected mobile customers' profile data is analyzed by, and/or under the direction of, one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application, to determine the desirability of the one or more products and/or services that are the subject of the mobile computing system based marketing devices.

Returning to FIG. 3, in one embodiment, at USE THE RESPONSE DATA CORRELATED TO A GIVEN MOBILE CUSTOMER TO DETERMINE WHICH FUTURE MOBILE COMPUTING BASED MARKETING DEVICES TO DISTRIBUTE TO THE GIVEN MOBILE CUSTOMER OPERATION 317 the created/updated mobile customer profiles associated with the respective selected mobile customers in the mobile customer database is analyzed by, and/or under the direction of, one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application, to determine the effectiveness of the mobile computing system based marketing devices of CREATE A MOBILE COMPUTING SYSTEM BASED MARKETING DEVICE INCLUDING ONE OR MORE HOOKS, THE MOBILE COMPUTING SYSTEM BASED MARKETING DEVICE BEING ASSOCIATED WITH A GIVEN PRODUCT AND/OR SERVICE OPERATION 305 and/or to make recommendations regarding the timing and terms of the distribution of future mobile computing system based marketing devices.

Returning to FIG. 3, in one embodiment, at USE THE RESPONSE DATA CORRELATED TO A GIVEN MOBILE CUSTOMER TO DETERMINE WHICH FUTURE MOBILE COMPUTING BASED MARKETING DEVICES TO DISTRIBUTE TO THE GIVEN MOBILE CUSTOMER OPERATION 317 the correlated response data for each selected mobile customer and/or the selected mobile customers' profile data is analyzed by, and/or under the direction of, one or more processors, such as CPUs 101 and/or 121 of FIG. 1, associated with one or more computing systems, such as computing system 100 of FIG. 1 and/or merchant mobile computing system 120 of FIG. 1, associated with the mobile application, such as mobile application 180 of FIGS. 1 and 2, and/or a provider of the mobile application, to identify any other mobile customer, product and/or service data, and/or marketing data desired by the merchant and/or product marketer that can be determined by the correlated response data for each selected mobile customer using any methods, means, mechanisms, procedures and/or processes discussed herein, and/or known in the art at the time of filing, and/or as developed after the time of filing.

In one embodiment, once the created/updated mobile customer profiles of STORE THE RESPONSE DATA CORRELATED TO THE MOBILE CUSTOMERS WITH THE RESPECTIVE MOBILE CUSTOMER'S' LISTING IN THE POTENTIAL MOBILE CUSTOMER DATABASE OPERATION 315 associated with the respective selected mobile customers of DISTRIBUTE THE MOBILE COMPUTING SYSTEM BASED MARKETING DEVICE TO SELECTED POTENTIAL MOBILE CUSTOMERS OF THE ONE OR MORE POTENTIAL MOBILE CUSTOMERS LISTED IN THE POTENTIAL MOBILE CUSTOMER DATABASE OPERATION 307 in the mobile customer database of CREATE A MOBILE CUSTOMER DATABASE INCLUDING A LISTING OF ONE OR MORE POTENTIAL MOBILE CUSTOMERS AND THEIR MOBILE CONTACT DATA OPERATION 303 are used to determine which of the selected mobile customers will be sent subsequent mobile computing system based marketing devices and/or the terms of any mobile computing system based marketing devices to be sent to the selected mobile customers at USE THE RESPONSE DATA CORRELATED TO A GIVEN MOBILE CUSTOMER TO DETERMINE WHICH FUTURE MOBILE COMPUTING BASED MARKETING DEVICES TO DISTRIBUTE TO THE GIVEN MOBILE CUSTOMER OPERATION 317 process flow proceeds to EXIT OPERATION 330. In one embodiment, at EXIT OPERATION 330, process for creating customer lists and customer profiles using mobile computing systems 300 is exited to await new data.

Using one embodiment of process for creating customer lists and customer profiles using mobile computing systems 300, small business owners, or other merchants and/or product marketers, can add potential mobile customers to their customer lists by providing a mechanism for the customers themselves to populate their own contact information via texting to a customizable virtual mobile number that the business has posted. In addition, using one embodiment of process for creating customer lists and customer profiles using mobile computing systems 300, the potential mobile customers indicate that they wish to be contacted by texting their contact information and thereby implicitly, or explicitly, consent to being contacted for marketing.

In addition, using one embodiment of process for creating customer lists and customer profiles using mobile computing systems 300, small business owners, or other merchants and/or product marketers, can relatively easily create mobile customer profiles using the mobile customers' responses to mobile computing system based marketing devices distributed to mobile customer mobile computing systems and/or hooks in the mobile computing system based marketing devices. Then, using one embodiment of process for creating customer lists and customer profiles using mobile computing systems 300, the small business owners, or other merchants and/or product marketers can use the mobile customer profiles to refine the mobile computing system based marketing devices and/or determine: the overall effectiveness of the mobile computing system based marketing devices; which mobile customers are interested in their specific mobile computing system based marketing devices; which mobile customers are loyal mobile customers; which mobile customers are receptive to specific mobile computing system based marketing devices; and/or which mobile customers are not receptive to specific mobile computing system based marketing devices; all from a centralized mobile application and database and without the need for manual methods such as notebooks and/or disjoint data files or manual data entry.

Consequently, using process for creating customer lists and customer profiles using mobile computing systems 300, small business owners, or other merchants and/or product marketers, can more easily and reliably add customers to their customer lists and create customer profiles for those customers using mobile computing system technology to more effectively target customers and create more effective marketing devices.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "creating", "distributing", "responding", "correlating", "using", "determining", "generating", "obtaining", "identifying", "analyzing", "presenting", "storing", "saving", "displaying", "categorizing", "providing", "processing", "accessing", "monitoring" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for creating mobile customer lists comprising the following of which a plurality are each executed via any set of one or more processors:

creating a mobile consumer database, the mobile consumer database including information regarding one or more potential mobile customers and contact information for the potential mobile customers;

receiving a text message for a first consumer to be added to an advertiser customer contact list as a potential mobile customer;

responsive to the request, automatically adding contact information for the first consumer to the advertiser customer contact list;

creating a mobile computing system based marketing device, the mobile computing system based marketing device being associated with a product or service offered by a merchant, the mobile computing system based marketing device including one or more hooks, the one or more hooks requesting a text message based response from a recipient of the mobile computing system based marketing device;

sending the mobile computing system based marketing device to selected ones of the potential mobile customers listed in the mobile customer database via text messages;

responsive to the text message, receiving a text message response from a responding mobile consumer of the potential mobile customers, the text message response including the one or more hooks;

generating response data representing the text message response;

correlating the response data to the responding mobile consumer;

storing the correlated response data in the mobile consumer database;

analyzing the correlated response data; and determining, as a result of the analysis of the correlated response data, at least one subsequent mobile computing system based marketing device to be sent to the responding mobile consumer.

2. The computing system implemented process for creating customer lists and customer profiles using mobile computing systems of claim 1, wherein creating a mobile consumer database comprises:

obtaining a virtual mobile telephone number;

requesting the one or more potential mobile customers to send a text message to the virtual mobile telephone number, the text message including mobile contact information;

receiving, responsive to the request, a text message response, the text message response comprising mobile contact information for the first consumer; and adding, to a potential customer contact list in the mobile customer database, information regarding the first consumer and respective mobile contact information.

3. The computing system implemented process for creating customer lists and customer profiles using mobile computing systems of claim 2, wherein the virtual mobile telephone number is a customizable virtual mobile telephone number.

4. The computing system implemented process for creating customer lists and customer profiles using mobile computing systems of claim 2, wherein the virtual mobile telephone number is a "long code" virtual mobile telephone number.

5. The computing system implemented process for creating customer lists and customer profiles using mobile computing systems of claim 2, wherein the virtual mobile telephone number is a "short code" virtual mobile telephone number.

6. The computing system implemented process for creating customer lists and customer profiles using mobile computing systems of claim 2, wherein the virtual mobile telephone number is made available by posting the virtual mobile telephone number at one or more physical locations.

7. The computing system implemented process for creating customer lists and customer profiles using mobile computing systems of claim 2, wherein the virtual mobile telephone number is made available by a posting of the virtual mobile telephone number on a website.

8. The computing system implemented process for creating customer lists and customer profiles using mobile computing systems of claim 2, wherein the text message is a Short Message Service (SMS) message.

9. The computing system implemented process for creating customer lists and customer profiles using mobile computing systems of claim 1, wherein
the mobile computing system based marketing device is a Short Message Service (SMS) message.

10. The computing system implemented process for creating customer lists and customer profiles using mobile computing systems of claim 1, wherein
the text message based response requested by one or more of the one more hooks is a text message based response selected from at least one of the group of text message based responses consisting of:
a text message based response indicating that the responding mobile consumer would like to redeem/receive a marketing device;
a text message based response indicating that the responding mobile consumer is interested in the product or service that is the subject of the mobile computing system based marketing device;
a text message based response indicating that the responding mobile consumer is interested in the terms of the offer that was provided via the mobile computing system based marketing device;
a text message based response indicating that the responding mobile consumer does not wish to be sent future mobile computing system based marketing devices associated with product or service that was the subject of the mobile computing system based marketing device; and
a text message based response indicating that the responding mobile consumer wishes to be sent future mobile computing system based marketing devices associated with product or service that was the subject of the mobile computing system based marketing device.

11. The computing system implemented process for creating customer lists and customer profiles using mobile computing systems of claim 1, further
determining, based on the analysis, one or more terms offered in a subsequent mobile computing system based marketing device to be sent to the responding mobile consumer.

12. The computing system implemented process for creating customer lists and customer profiles using mobile computing systems of claim 1, wherein
the correlated response data is analyzed to determine the effectiveness of the mobile computing system based marketing device.

13. A computer program product for creating customer lists and customer profiles using mobile computing systems comprising:
a nontransitory computer readable medium;
and computer program code, encoded on the computer readable medium, comprising computer readable instructions which, when executed via any set of one or more processors, perform the following:
creating a mobile consumer database, the mobile consumer database including information regarding one or more potential mobile customers and contact information for the potential mobile customers;
receiving a text message for a first consumer to be added to an advertiser customer contact list as a potential mobile customer;
responsive to the request, automatically adding contact information for the first consumer to the advertiser customer contact list;
creating a mobile computing system based marketing device, the mobile computing system based marketing device being associated with a product or service offered by a merchant, the mobile computing system based marketing device including one or more hooks, the one or more hooks requesting a text message based response from a recipient of the mobile computing system based marketing device;
sending the mobile computing system based marketing device to selected ones of the potential mobile customers listed in the mobile customer database via text messages;
responsive to the text message, receiving a text message response from a responding mobile consumer of the potential mobile customers, the text message response including the one or more hooks;
generating response data representing the text message response;
correlating the response data to the responding mobile consumer;
storing the correlated response data in the mobile consumer database;
analyzing the correlated response data; and
determining, as a result of the analysis of the correlated response data, at least one subsequent mobile computing system based marketing device to be sent to the responding mobile consumer.

14. The computer program product for creating customer lists and customer profiles using mobile computing systems of claim 13, wherein creating a mobile consumer database comprises:
obtaining a virtual mobile telephone number;
requesting the one or more potential mobile customers to send a text message to the virtual mobile telephone number, the text message including mobile contact information;
receiving, responsive to the request, a text message response, the text message response comprising mobile contact information for the first consumer; and
adding, to a potential customer contact list in the mobile customer database, information regarding the first consumer and respective mobile contact information.

15. The computer program product for creating customer lists and customer profiles using mobile computing systems of claim 14, wherein
the virtual mobile telephone number is a customizable virtual mobile telephone number.

16. The computer program product for creating customer lists and customer profiles using mobile computing systems of claim 14, wherein
the virtual mobile telephone number is a "long code" virtual mobile telephone number.

17. The computer program product for creating customer lists and customer profiles using mobile computing systems of claim 14, wherein
the virtual mobile telephone number is a "short code" virtual mobile telephone number.

18. The computer program product for creating customer lists and customer profiles using mobile computing systems of claim 14, wherein
the virtual mobile telephone number is made available by posting the virtual mobile telephone number at one or more physical locations.

19. The computer program product for creating customer lists and customer profiles using mobile computing systems of claim 14, wherein
the virtual mobile telephone number is made available by a posting of the virtual mobile telephone number on a website.

20. The computer program product for creating customer lists and customer profiles using mobile computing systems of claim 14, wherein
the text message is a Short Message Service (SMS) message.

21. The computer program product for creating customer lists and customer profiles using mobile computing systems of claim 13, wherein
the mobile computing system based marketing device is a Short Message Service (SMS) message.

22. The computer program product for creating customer lists and customer profiles using mobile computing systems of claim 13, wherein
the text message based response requested by one or more of the one more hooks is a text message based response selected from at least one of the group of text message based responses consisting of:
a text message based response indicating that the responding mobile consumer would like to redeem/receive a marketing device;
a text message based response indicating that the responding mobile consumer is interested in the product or service that is the subject of the mobile computing system based marketing device;
a text message based response indicating that the responding mobile consumer is interested in the terms of the offer that was provided via the mobile computing system based marketing device;
a text message based response indicating that the responding mobile consumer does not wish to be sent future mobile computing system based marketing devices associated with product or service that was the subject of the mobile computing system based marketing device; and
a text message based response indicating that the responding mobile consumer wishes to be sent future mobile computing system based marketing devices associated with product or service that was the subject of the mobile computing system based marketing device.

23. The computer program product for creating customer lists and customer profiles using mobile computing systems of claim 13, further
determining, based on the analysis, one or more terms offered in a subsequent mobile computing system based marketing devices sent to the responding mobile consumer.

24. The computer program product for creating customer lists and customer profiles using mobile computing systems of claim 13, wherein
the correlated response data is analyzed to determine the effectiveness of the mobile computing system based marketing device.

\* \* \* \* \*